(12) United States Patent
Torrell et al.

(10) Patent No.: US 7,951,236 B2
(45) Date of Patent: May 31, 2011

(54) LIQUID GRAPHITE

(75) Inventors: Kathleen Torrell, Playa Del Rey, CA (US); Anthony P. Bazan, Calabasas, CA (US); Kwong Hang Adwood Tang, Tin Shui Wai (HK)

(73) Assignee: JAKKS Pacific, Inc., Malibu, CA (US)

( * ) Notice: Subject to any disclaimer, the term of this patent is extended or adjusted under 35 U.S.C. 154(b) by 1148 days.

(21) Appl. No.: 11/406,046

(22) Filed: Apr. 17, 2006

(65) Prior Publication Data

US 2007/0243006 A1  Oct. 18, 2007

Related U.S. Application Data

(60) Provisional application No. 60/671,967, filed on Apr. 16, 2005.

(51) Int. Cl.
*C09D 11/16* (2006.01)
*C08K 5/05* (2006.01)

(52) U.S. Cl. ..................... 106/31.64; 524/385
(58) Field of Classification Search .................. 524/379, 524/385; 106/31.64
See application file for complete search history.

(56) References Cited

U.S. PATENT DOCUMENTS

| | | | |
|---|---|---|---|
| 1 A | 7/1836 | Ruggles | |
| 1,920,361 A | 8/1933 | Daneke | |
| 2,180,132 A | 11/1939 | Zoll | |
| D136,595 S | 11/1943 | Pleasants | |
| 2,715,388 A | 8/1955 | Cofield, Jr. et al. | |
| 2,734,838 A | 2/1956 | Clancy et al. | |
| 2,790,202 A | 4/1957 | Lorenian | |
| 2,852,397 A | 9/1958 | Goessling | |
| 2,956,038 A | 10/1960 | Juelss et al. | |
| 3,425,779 A * | 2/1969 | Fisher et al. | 401/190 |
| 3,859,701 A * | 1/1975 | Huber | 492/30 |
| 4,097,290 A | 6/1978 | Muller et al. | |
| 4,149,811 A | 4/1979 | Coffman | |
| 4,176,978 A | 12/1979 | Ruzicka et al. | |
| 4,383,875 A | 5/1983 | Russ et al. | |
| 4,545,983 A | 10/1985 | Russ et al. | |
| 4,897,142 A | 1/1990 | Chenal | |
| 5,228,794 A | 7/1993 | Hochstetler | |
| 5,354,140 A | 10/1994 | Diakoulas | |
| 5,364,197 A | 11/1994 | Powers | |
| 5,399,041 A | 3/1995 | Chiswell | |
| 5,437,715 A | 8/1995 | Idogawa et al. | |
| 5,549,779 A | 8/1996 | Stoecklein | |
| 5,735,622 A | 4/1998 | Melnick et al. | |
| 5,893,671 A | 4/1999 | Bellue | |
| 5,984,556 A | 11/1999 | Gray et al. | |
| 6,062,753 A | 5/2000 | Hadtke et al. | |
| 6,139,671 A | 10/2000 | Shin-Dih | |
| 6,179,502 B1 | 1/2001 | Gray | |
| 6,572,295 B1 | 6/2003 | Chochoy et al. | |
| 6,648,536 B1 | 11/2003 | Bellue | |

FOREIGN PATENT DOCUMENTS

| | | | |
|---|---|---|---|
| EP | 0 322 805 A | | 7/1989 |
| JP | 56-014568 | * | 2/1981 |

OTHER PUBLICATIONS

Patent Abstracts of Japan 56-014568. Feb. 1981.*
Handbook of Adhesives, Chapter 19. Irving Skeist. Reinhold Publishing Corporation. New York. 1962.*

* cited by examiner

*Primary Examiner* — Milton I Cano
*Assistant Examiner* — John Uselding
(74) *Attorney, Agent, or Firm* — Tope-McKay & Associates

(57) ABSTRACT

A composition of liquid graphite is presented. The liquid graphite can be erased and applied to a surface using a writing instrument such as a ball point pen with a consistency, accuracy and darkness equivalent to that of a standard graphite, No. 2 pencil. The liquid graphite comprises a formulation of carbon powder, solvent and adhesive in a concentration that provides a dark, consistent marking.

13 Claims, No Drawings

LIQUID GRAPHITE

PRIORITY CLAIM

The present application claims the benefit of priority of U.S. Provisional Patent Application No. 60/671,967, filed Apr. 16, 2005, entitled "Liquid Graphite."

BACKGROUND OF THE INVENTION (1) Technical Field

The present invention relates to a composition of liquid graphite. More specifically, the present invention relates to a composition of carbon powder, solvent and adhesive that can be used in a writing instrument, completely erased, and applied with a consistency, accuracy and darkness equivalent to that of a standard graphite pencil.

(2) Description of Related Art

Graphite pencils enjoy wide use and provide distinct advantages in writing and marking. Although functional, traditional pencils have several drawbacks. Pencils require constant sharpening where, after being dulled, they must be re-sharpened. Additionally, the graphite core is subject to breaking. In some circumstances, when the graphite core breaks, the pencil becomes virtually useless with the graphite simply falling out of the pencil.

As an alternative to a pencil, an ink pen may be used. An ink pen generally comprises an elongated barrel with an ink cartridge and a ball point tip. Although an ink pen does not need to be sharpened and does not break, it does have some inherent drawbacks. For example, when applied to paper, ink is subject to smearing and bleeding. Additionally, because the ink is absorbed into the fibers of paper, most inks are non-erasable.

To overcome problems associated with ink and to gain the benefits of graphite pencils, several forms of liquid graphite have been devised. U.S. Pat. Nos. 2,715,388; 2,852,397 and 2,956,038, issued to Cofield et al., Goessling, and Juelss et al., respectively, disclose forms of liquid graphite. However, existing liquid graphite compositions have several limitations. Many liquid graphite compositions are primarily liquid with only small concentrations of graphite, and rely on the absorption of the liquid and dissolved graphite into a porous writing surface such as paper to leave a mark. This process embeds the graphite within the writing surface and prevents it from being erased. Some existing liquid graphite compositions add darkening agents such as black ink in order to produce a darker mark, which further prevents the mark from being erased. Additionally, writing instruments using existing liquid graphite compositions suffer from pooling during application to a writing surface and leave an inconsistent, spread-out pattern of graphite as the liquid absorbs into the paper. Most existing liquid graphite compositions do not meet the standard graphite ratings for darkness and cannot be considered a "No. 2" equivalent, the established graphite hardness rating for standardized testing. Furthermore, a marking made with an existing liquid graphite solution is difficult to photocopy or scan into an electronic format.

Therefore, a need exists in the art for a composition of liquid graphite that is erasable and capable of being applied in a solid, dense marking that is suitable for use in standardized tests and for photocopying or scanning.

SUMMARY OF THE INVENTION

The present invention overcomes the aforementioned limitations and fulfills the aforementioned needs by providing a composition of liquid graphite that can be erased and applied with a consistency, accuracy and darkness equivalent to that of a standard graphite pencil. The liquid graphite comprises a formulation of carbon, solvent and adhesive in a concentration that provides a dark, consistent mark on a surface. The application of liquid graphite is suitable for use in a ball point pen and does not leave a liquid stain or absorb into paper.

In one aspect of the invention, the erasable liquid graphite solution consists essentially of a concentration of carbon powder, a solvent and an adhesive.

In another aspect of the invention, the carbon powder is graphite powder or carbon black powder.

In still another aspect of the invention, the solvent is an alcohol-based solvent.

In yet another aspect of the invention, the solvent is benzyl alcohol ($C_7H_8O$).

In a further aspect of the invention, the adhesive is phenyl formaldehyde polymer ($C_6H_6OCH_2O$).

In one aspect of the invention, the concentration of carbon powder is approximately 55% to 80% by volume of the solution, the concentration of solvent is approximately 10% to 30% by volume of the solution, and the concentration of adhesive is approximately 5% to 15% by volume of the solution.

In a method, each of the aforementioned components may be formed into an erasable liquid graphite solution In another aspect of the invention, a writing instrument uses an erasable liquid graphite solution, the solution comprising a concentration of carbon powder, a solvent and an adhesive.

DETAILED DESCRIPTION (1) Introduction

The present invention relates to a composition of matter and specifically a composition of liquid graphite that can be used in a pen or other writing instrument, completely erased, and applied to a surface with consistency, accuracy and darkness equivalent to that of a standard graphite pencil.

The following description is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

The present invention provides a composition of liquid graphite that can be applied to a surface with a writing instrument such as a pen, and possesses the properties of solid graphite found in a standard graphite pencil. The liquid graphite can be applied smoothly with a writing instrument to create accurate, consistent markings similar to a ball point pen and as good as or better than standard graphite pencils. Additionally, the liquid graphite of the present invention is a composition of pure carbon with no liquid darkening agents or inks. The composition of the present invention includes a liquid adhesive agent which bonds the carbon to the surface of a writing material instead of allowing the carbon to be absorbed into the writing material. Therefore, it can be applied to the surface of a writing material such as paper and still be erased with a standard rubber pencil eraser.

The solution of liquid graphite in the present invention is composed of sufficient carbon concentration to write as dark as a standard No. 2 pencil, making it suitable for standardized testing machines which require a dark, erasable mark for scanning. Additionally, liquid graphite is capable of being applied with sufficient density and darkness to be picked up with an optical scanner or photocopier, making it suitable for documents that must be reproduced or stored electronically.

(2) Components of Liquid Graphite

The liquid graphite of the present invention is a composition of carbon powder, a solvent, and an adhesive. The solvent acts to dissolve the carbon powder into a liquid solution and aids in the process of applying the carbon powder to a surface. The adhesive acts to bond the carbon powder to the surface of a writing material to enable the carbon powder to later be erased.

(3) Carbon Powder

In one embodiment of the present invention, graphite powder, an allotrope of carbon with a black color and soft texture, is dissolved with the solvent and adhesive to form the liquid graphite composition. Additionally, carbon black powder, another allotrope of carbon with similar properties, can also be used to dissolve with the solvent. The size of carbon powder particles to be used will vary but should be small enough to dissolve into the solvent and prevent particles from collecting on the tip of the writing instrument or other means for applying the liquid graphite. However, the carbon powder particles must be of sufficient size to be visible when applied to a surface.

The specific concentration of graphite powder or carbon black powder will vary depending upon the darkness desired and specific use intended. In one embodiment of the present invention, a concentration of at least 55 percent carbon black powder will establish a darkness equivalent to that of a No. 2 rated pencil. The higher the concentration of graphite powder or carbon black powder in solution, the darker the liquid graphite will appear when applied to a surface.

(4) Solvent

The concentration of solvent determines the ease with which the liquid graphite can be erased. The higher the concentration of solvent, the harder it is to erase the marking from a surface. When the solvent is applied to a writing surface, especially a porous material such as paper, the solvent absorbs into the paper and then dries out. The solvent therefore carries the dissolved carbon powder into the paper, making it extremely difficult to remove unless the surface of the paper is destroyed. Therefore, in the present invention, it is desirable to use a low concentration of solvent to prevent the carbon powder from dissolving into the surface to which applied. In one embodiment of the present invention, a concentration of 20 percent solvent by volume of the solution is used along with a 70 percent concentration by volume of the solution of carbon powder and a 10 percent concentration by volume of the solution of adhesive. At this concentration, the amount of carbon powder that dissolves into a paper surface is negligible.

In one aspect of the present invention, the solvent is benzyl alcohol ($C_7H_8O$). However, one skilled in the art will appreciate that other solvents can be used to achieve similar results.

(5) Adhesive

The adhesive serves to bond the carbon powder to the surface of the writing material and prevent the carbon powder from absorbing into the writing surface where it cannot be erased. The concentration of adhesive will also vary depending on the intended use for the liquid graphite and the desired adhesion. In one embodiment of the present invention, a concentration of 10 percent by volume of the solution adhesive is used along with a 70 percent concentration by volume of the solution of carbon powder and a 20 percent concentration by volume of the solution of solvent.

In one embodiment of the present invention, the adhesive used is a phenyl formaldehyde polymer ($C_6H_6OCH_2O$). However, one skilled in the art will appreciate that other adhesive agents can be used to achieve similar results.

What is claimed is:

1. An erasable liquid graphite solution comprising: a concentration of carbon powder, a solvent and an adhesive; and
   wherein the concentration of carbon powder is approximately 70% to 80% by volume of the solution, the concentration of solvent is approximately 10% to 30% by volume of the solution, and the concentration of adhesive is approximately 5% to 15% by volume of the solution.

2. The erasable liquid graphite solution as set forth in claim 1, wherein the carbon powder is graphite powder or carbon black powder.

3. The erasable liquid graphite solution as set forth in claim 1, wherein the solvent is an alcohol-based solvent.

4. The erasable liquid graphite solution as set forth in claim 3, wherein the solvent is benzyl alcohol.

5. The erasable liquid graphite solution as set forth in claim 1, wherein the adhesive is phenyl formaldehyde polymer.

6. The erasable liquid graphite solution as set forth in claim 2, wherein the solvent is an alcohol-based solvent.

7. The erasable liquid graphite solution as set forth in claim 6, wherein the solvent is benzyl alcohol.

8. An erasable liquid graphite solution comprising: a concentration of carbon black powder of approximately 70% to 80% by volume of the solution, a concentration of benzyl alcohol solvent of approximately 10% to 30% by volume of the solution, and a concentration of phenyl formaldehyde polymer adhesive of approximately 5% to 15% by volume of the solution.

9. A writing instrument using an erasable liquid graphite solution, the solution comprising a concentration of carbon powder, a solvent and an adhesive; and
   wherein the concentration of carbon powder is approximately 70% to 80% by volume of the solution, the concentration of solvent is approximately 10% to 30% by volume of the solution, and the concentration of adhesive is approximately 5% to 15% by volume of the solution.

10. The writing instrument using an erasable liquid graphite solution as set forth in claim 9, wherein the carbon powder is graphite powder or carbon black powder.

11. The writing instrument using an erasable liquid graphite solution as set forth in claim 10, wherein the solvent is an alcohol-based solvent.

12. The writing instrument using an erasable liquid graphite solution as set forth in claim 11, wherein the solvent is benzyl alcohol.

13. The writing instrument using an erasable liquid graphite solution as set forth in claim 12, wherein the adhesive is phenyl formaldehyde polymer.

* * * * *